UNITED STATES PATENT OFFICE.

ALBRECHT SCHMIDT, OF HÖCHST-ON-THE-MAIN, AND GEORG KRÄNZLEIN, OF SINDLINGEN, NEAR HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

CONDENSATION PRODUCTS OF THE ANTHRACENE SERIES AND PROCESS OF MAKING SAME.

1,052,520.     Specification of Letters Patent.     Patented Feb. 11, 1913.

No Drawing.     Application filed March 30, 1912. Serial No. 687,451.

*To all whom it may concern:*

Be it known that we, ALBRECHT SCHMIDT, Ph. D., chemist, and GEORG KRÄNZLEIN, Ph. D., chemist, citizens of the Empire of Germany, residing at Höchst-on-the-Main and Sindlingen, near Höchst-on-the-Main, Germany, respectively, have invented certain new and useful Improvements in Condensation Products of the Anthracene Series and Processes of Making Same, of which the following is a specification.

We have found that the quinones (under which term we comprise quinone itself and its substitution products, such as halogen quinone, chloranil or the like), when combined with anthranols (under which term we comprise anthranol itself and its substitution products, such as halogen anthranols, etc.), form condensation products which can be used as vat dyestuffs and as parent products for the same.

The following examples illustrate our invention:

I. 18 kg. of anthranol are heated to boiling for some hours with 11 kg. of quinone in 180 kg. of nitrobenzene, whereby, in consequence of the reaction which sets in, water is split off, the liquid assuming an intense bluish green coloration. The oxygen required for the reaction may be derived from the air, or it may be produced by the coöperation of the quinone or the nitrobenzene. In any case oxidizing agents (such for instance as an excess of quinone, nitrohydrocarbons, etc.) promote the reaction. After cooling, the mass is filtered, washed with hot alcohol and dried. The dyestuff thus obtained forms crystals of a metallic luster, which gives a reddish-violet vat, from which cotton is dyed blue tints which are not destroyed by a solution of chlorid of lime.

In the place of anthranol there may be employed substituted anthranols, whereby differences of shades may be obtained, as will be seen by the tabular statement hereafter to be found.

II. 19.5 kg. of anthranol are boiled for some days on the reflux apparatus with 24 kg. of chloranil in 300 kg. of xylene. The liquid assumes an intense green color with formation of hydrochloric acid, while slowly separating the dyestuff. The latter, after cooling, is filtered off, washed with alcohol and dried. Thus a greenish-black crystalline powder is obtained, giving a bluish violet vat which dyes cotton clear green tints of excellent fastness to washing and resisting well the action of chlorin. The formation of the dyestuff may be facilitated by an agent neutralizing hydrochloric acid, for instance anhydrous sodium acetate, or a catalytic agent, for instance copper chlorid.

If the condensation is effected in a medium of a higher boiling point, for instance in nitrobenzene, there is obtained a blue dyestuff after extraction of the product of the reaction by means of hot alcohol, which dyestuff very much resembles that obtained according to Example I, as regards its tinctorial properties. In an analogous manner, by using other anthranols there are obtained different reaction products, according as they are condensed with chloranil at a higher or at a lower temperature. Thus, for instance, the product obtainable in the same way according to Example II., by the reaction of β-aminoanthranol with chloranil in xylene, constitutes a dyestuff dyeing cotton olive-green tints, whereas that obtained when using nitrobenzene instead of xylene dyes bluish-gray tints.

The following tabular statement refers to Example I and gives the tints obtainable by the various dyestuffs:

| Dyestuff. | Solution in concentrated sulfuric acid. | Color of the vat. | Dyeings on cotton after soaping. |
|---|---|---|---|
| (1) Anthranol+quinone | Violet-red | Violet-red | Blue. |
| (2) Anthranol from α-chloranthraquinone+quinone. | Brown | Brownish red. | Gray. |
| (3) Anthranol from β-chloranthraquinone+quinone. | Violet-brown. | Reddish-brown. | Gray. |
| (4) β-methylanthranol + quinone. | Dull brown. | Brownish-violet. | Green. |
| (5) Chlornaphthanthranol+quinone. | Olive yellow. | Brownish-orange. | Brown. |
| (6) Anthranol of the β-β-di-anthraquinoaylurea+quinone. | Brownish | Violet | Bluish-gray. |
| (7) Dianthranol+quinone | Brownish. | Violet | Blue. |
| (8) Anthranol + chloranil in nitrobenzene. | Fuchsin-red. | Violet | Blue. |
| (9) Anthranol + chloranil in xylene. | Brownish-red. | Bluish-violet. | Green. |
| (10) β-aminoanthranol+chloranil in xylene. | Olive-yellow. | Olive | Grayish-olive. |

Having now described our invention, what we claim is:

1. The process of manufacturing condensation products of the anthracene series, which consists in condensing anthranols with quinones.

2. The process of manufacturing condensation products of the anthracene series, which consists in combining anthranols with quinones in presence of a suitable medium.

3. The process of manufacturing condensation products of the anthracene series, which consists in combining anthranols with quinones in presence of a suitable medium and an agent neutralizing hydrochloric acid.

4. As new articles of manufacture, the condensation products of an anthranol with a quinone, being crystalline powders, insoluble in diluted acids and alkalis, soluble in concentrated sulfuric acid to yellow, brown to red tints, yielding when treated with alkaline reducing agents, brown, red to violet vats which dye cotton, after soaping, blue, green to olive-gray tints of excellent fastness.

5. As a new article of manufacture, the condensation-product of anthranol and chloranil, being a greenish-black crystalline powder, soluble in concentrated sulfuric acid with a brownish-red color and which dyes cotton from the hydrosulfite vat, showing a bluish-violet color, after soaping, greenish tints of excellent fastness to washing and bowking and resisting very well the action of chlorin.

In testimony whereof, we affix our signatures in presence of two witnesses.

ALBRECHT SCHMIDT.
GEORG KRÄNZLEIN.

Witnesses:
JEAN GRUND,
CARL GRUND.